(12) United States Patent
Roy et al.

(10) Patent No.: US 6,496,859 B2
(45) Date of Patent: Dec. 17, 2002

(54) SYSTEM FOR NETWORK DEVICE LOCATION

(75) Inventors: Joydeep Roy, Portland, OR (US); Stephen F. Tarr, Portland, OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/199,935

(22) Filed: Nov. 25, 1998

(65) Prior Publication Data

US 2002/0062366 A1 May 23, 2002

(51) Int. Cl.$^7$ .................. G06F 15/173; H04L 12/28
(52) U.S. Cl. ........................... 709/223; 370/255
(58) Field of Search .................. 709/224, 223, 709/222; 370/254, 255

(56) References Cited

U.S. PATENT DOCUMENTS

| | | | | |
|---|---|---|---|---|
| 5,185,860 A | * | 2/1993 | Wu | 709/224 |
| 5,511,208 A | * | 4/1996 | Boyles | 709/223 |
| 5,710,885 A | * | 1/1998 | Bondi | 709/224 |
| 5,835,720 A | * | 11/1998 | Nelson | 709/224 |
| 5,835,725 A | * | 11/1998 | Chiang | 709/228 |
| 6,249,814 B1 | * | 6/2001 | Shaffer et al. | 709/223 |

OTHER PUBLICATIONS

"Service Location Protocol"—Internet Request for Comments Document 2165.

* cited by examiner

*Primary Examiner*—Glenton B. Burgess
*Assistant Examiner*—Abdullahi E. Salad

(57) ABSTRACT

A managment station responds to an HTTP request for device discovery by spawning a device discovery task that creates a linked list and first broadcasts UDP based requests out on a subnetwork for devices on the same subnetwork to respond. Device information from responding network devices is stored in a linked list. This process is repeated until a specified length of time has expired. Then a second broadcast request is sent out that includes a list of printers that have responded so that they will nor keep responding. The list is updated by responses until there are no more responses. Any nodes in the linked list that still only have a network address are upadated by sending a unicast SNMP request those network addresses in order to get the additional information. The data from the linked list is sent back to the HTTP client.

9 Claims, 7 Drawing Sheets

DLP Request Protocol

```
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-
<Version Number>
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-
<Length of DLP Section>
+-+-+-+-+-+-+-+-+-+-+-+-+-+-+-+-+-+-+-+-+-+-+-+-+-+-+-+-+-+-+-+-
<Length of Model |
Name>            |<Model Name>
+-+-+-+-+-+-+-+-+-+-+-+-+-+-+-+-+-+-+-+-+-+-+-+-+-+-+-+-+-+-+-+-
<Length of IP  | IP Address 1
Address 1>     |
+-+-+-+-+-+-+-+-+-+-+-+-+-+-+-+-+-+-+-+-+-+-+-+-+-+-+-+-+-+-+-+-
 . . . .
 . . . .
 . . . .
 . . .
 . . .
+-+-+-+-+-+-+-+-+-+-+-+-+-+-+-+-+-+-+-+-+-+-+-+-+-+-+-+-+-+-+-+-
<Length of IP  | IP Address N-1
Address N-1>   |
+-+-+-+-+-+-+-+-+-+-+-+-+-+-+-+-+-+-+-+-+-+-+-+-+-+-+-+-+-+-+-+-
<Length of IP  | IP Address N
Address N>     |
+-+-+-+-+-+-+-+-+-+-+-+-+-+-+-+-+-+-+-+-+-+-+-+-+-+-+-+-+-+-+-+-
```

4 bytes - Version Number
4 bytes - Length of the DLP section of the packet, this includes 1st 4 bytes for length, 1 byte for Model Name Length say N, N bytes of Model Name Length, Length of Previous Responder's List.

1 byte - Length of Model Name String - N
N bytes - Model Name String 1 byte - Length of IP Address N1
11 bytes - IP Address 1

*FIG. 3*

DLP Response Protocol

```
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
|<Version Number>                                                |
+-+-+-+-+-+-+-+-+-+-+-+-+-+-+-+-+-+-+-+-+-+-+-+-+-+-+-+-+-+-+-+-+
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
|<Length of DLP Section>                                         |
+-+-+-+-+-+-+-+-+-+-+-+-+-+-+-+-+-+-+-+-+-+-+-+-+-+-+-+-+-+-+-+-+
|<Length of Model  |<Model Name>                                 |
 Name>
+-+-+-+-+-+-+-+-+-+-+-+-+-+-+-+-+-+-+-+-+-+-+-+-+-+-+-+-+-+-+-+-+
|<Length of IP
 Address>         |<Current Responder's IP Address - 134.62.80.100>
+-+-+-+-+-+-+-+-+-+-+-+-+-+-+-+-+-+-+-+-+-+-+-+-+-+-+-+-+-+-+-+-+
|<Length of MAC
 Address>         |<Current Responder's MAC Address - 08:11:00:08:f:c1>
+-+-+-+-+-+-+-+-+-+-+-+-+-+-+-+-+-+-+-+-+-+-+-+-+-+-+-+-+-+-+-+-+
```

FIG. 4

| | Current Status for printer named: Phaser 840DP-21 | |
|---|---|---|
| Status | | |
| Configuration | STATUS | |
| Help | Printer Status: | Media Empty |
| Reference | Upper Media Tray: | Letter, Paper, Empty |
| Smart Ideas | Middle Media Tray: | Letter, Paper |
| | Lower Media Tray: | Letter, Paper, Empty |
| List Printers | Ink Status: | Ok |
| | Maintenance Kit Remaining Life: | 5328 Pages |
| | DEFAULT PRINTER SETTINGS | |
| | Print Quality Mode: | Standard |
| | TekColor Correction: | Automatic |
| | Image Smoothing Enabled: | No |
| | Media Source: | AutoSelect |
| | Start Status Update | |

View Printer List for printer named: Phaser 840DP-18

Status

Configuration

Help

Reference

Smart Ideas

List Printers

| Printer Name | Printer Model | Printer IP Name | Printer Status |
|---|---|---|---|
| Art's Chukar | Phaser 740 | 134.62.90.59 | Ready |
| Art's Chukar II | Phaser 740P | 134.62.91.226 | Busy |
| Audreys P10031 | Phaser 780P | 134.62.66.76 | Ready |
| Beaver | Phaser 840DX | 134.62.90.181 | Ready |
| BO10126 | Phaser 840DP | 134.62.91.199 | Warning Exists |
| BO10169 | Phaser 840DP | 134.62.91.108 | Busy |
| Chantals 780 | Phaser 780P | 134.62.82.233 | Warning Exists |
| Chukars Running Wild | Phaser 740E | 134.62.91.184 | Busy |
| Dan's Falcon | Phaser 360 | 134.62.35.30 | Ready |
| EngUnit1 | Phaser 780P | 134.62.90.88 | Busy |
| EngUnit2 | Phaser 780P | 134.62.90.85 | Warning Exists |
| EngUnit3 | Phaser 780P | 134.62.90.237 | Warning Exists |
| EngUnit4 | Phaser 780P | 134.62.66.173 | Ready |
| firefly | Phaser 350 | 134.62.91.35 | Waiting |
| iiLINX SIJ 100-1 | iiLINX SIJ 100 | 134.62.93.243 | Error Exists |

SYSTEM FOR NETWORK DEVICE LOCATION

BACKGROUND OF THE INVENTION

The present invention relates to locating devices on a network, and more particularly to allowing a network device to locate other network devices on the same sub-network.

Some users of devices residing on a network find it desirable to locate all or a class of other devices on the network. For example, a user may wish to have a list of all the printers of a certain brand, along with information about those printers that are on the same sub-network. Typically, a network device would perform such a search using a network communications method (protocol) such as Simple Network Management Protocol (SNMP).

A network device typically searches for other devices on the network by sending (User Datagram Protocol) UDP messages to the sub-network and then waiting for particular responses from network devices that are listening on the same sub-network. The network device that sends out the request is typically called a management station and a device responding to such a request is typically referred to as a network agent.

UDP is a protocol that offers a limited amount of service when messages are exchanged between network devices in a network that uses the Internet Protocol (IP). A persistent problem is the loss of information packets due to congestion in the network or the receiving device, whether a management station or agent. Congestion essentially is the existence of interfering messages. One way this problem can occur, for example, is when responses from network agents arrive as a result of the UIDP broadcast message from the management station and they are initially received by the on-board Ethernet driver. This driver executes at a high priority intercepting every packet that arrives. If the packet has the expected frame type then the packet is ready to be delivered to the IP layer of the network stack. The IP task, which is running at a lower priority than the Ethernet driver, needs to accept as many packets as possible from the Ethernet driver. The total buffer area for the IP task is finite and the buffer for the Ethernet driver is also finite. Available buffer space depends on how fast the application task that is executing UDP routines can read and consume the data. Since both the IP task and the UDP level task run at a lower priority than the Ethernet Driver and total buffer space of the Ethernet driver is limited, the management station will not be able to read all the UDP based response packets that arrive at the on-board Ethernet driver. This approach of using UDP alone prevents an exhaustive and reliable search of the network since some request or response packets can be lost.

Service Location Protocol (SLP), described in the Internet Request For Comments document 2165 (RFC 2165), is one protocol that may be used instead of, or to supplement UDP based SNMP broadcast and responses. SLP provides a means to send in the broadcast request a list of devices that have already responded such that those who have already responded will not do so again. However, using SLP would result in slower and more cumbersome location of devices on the network because of it's complexity and lack of specialization.

A second problem also exists when attempting to locate or find devices with no IP address. Prior approaches using IP multicasting require registration with the router and therefore do not provide a complete solution.

What is desired is a system for network device location that provides a faster and more exhaustive search which supplements the basic UDP broadcast and responses in order to reliably receive response packets from network agents or devices, and to uniquely identify those devices without relying on their IP address.

SUMMARY OF THE INVENTION

Accordingly, the present invention provides a faster, more exhaustive search and supplements the basic UDP broadcast and responses in order to receive and read more response packets from network agents. The present invention provides an approach to achieve device location discovery based on a MAC (media access channel) address even though the IP address is not known.

The invention employs a unicast (HTTP) request that is sent on a network to a device, such as a printer, with a known location and that device discovers other devices with unknown network locations. The device with the known location returns a web page to the user showing its status, with links to the other discovered devices. The user can then select the link to one of the newly discovered devices and view the web page of the selected device.

A device implementing this invention responds to an HTTP request for device discovery by spawning a device discovery task that broadcasts a SNMP over UDP based request out on a sub-network for devices to respond. When responses are received they are parsed and the device information such as network address, name, status, version and model is added to a list of discovered devices. Any responses from devices outside a specified class of devices, such as those not of a certain brand, are disregarded. The task waits for the responses until a specified amount of time has expired.

Then a device location protocol (DLP) over UDP broadcast request is sent out that includes a list of devices, such as printers, that have responded. The request is that only devices not on the list respond. Responses are then parsed and the responding device's network address is added to the list of responding devices. This process is repeated until there are no more responses.

The management station may use unicast SNMP requests to the devices in the list to learn additional information about those devices which have an assigned IP address. The data from the linked list is then copied into a (Hypertext Markup Language) HTML buffer to be sent to the HTTP client that sent the original request.

These aspects, advantages, and other novel features of the present invention are apparent from the following detailed description when read in conjunction with the appended claims and attached drawings.

BRIEF DESCRIPTION OF THE DRAWING

FIG. 3 is a diagram of a device location protocol (DLP) request packet according to the present invention.

FIG. 4 is a diagram of a device location protocol (DLP) response packet according to the present invention.

FIG. 6 is a sample of the web page viewed by the user in FIG. 5.

FIG. 7 is a list of locations of other devices linked to the known device in FIG. 5.

DESCRIPTION OF THE PREFERRED EMBODIMENT

Figure 1:
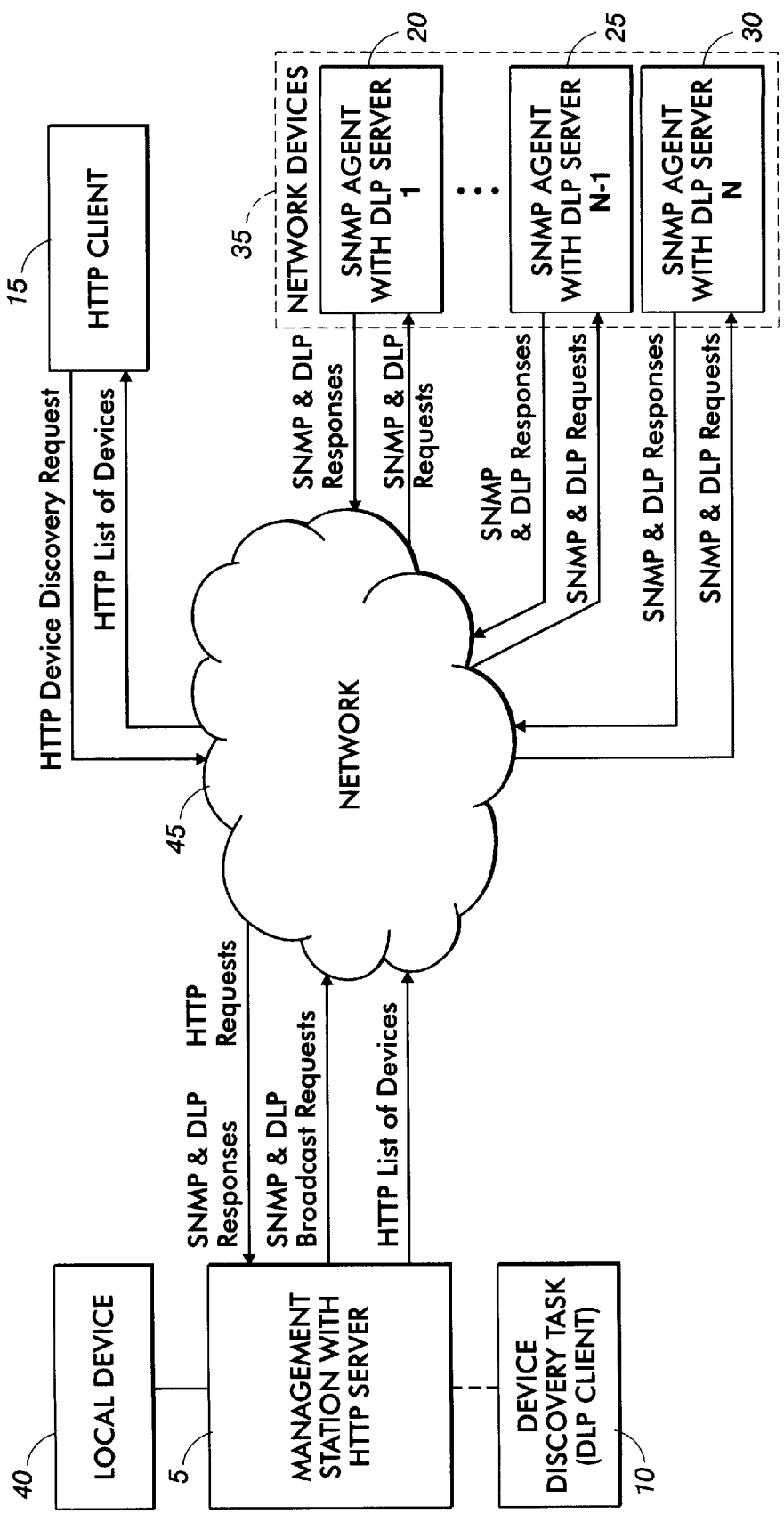
FIG. 1 is a block diagram representing various servers and clients on a network that are involved in network device location according to the present invention.

Referring to FIG. 1, various network devices 35 such as printers reside on a network 45. A user on the network with a Hypertext Transfer Protocol (HTTP) client 15, or web browser, wishes to find either all devices that reside on the network 45, or those of a specified class, such as a certain brand of printers, and obtain information about those devices. The HTTP client 15 sends an HTTP request to a management station 5, which has an HTTP server running in order to find desired network devices. This request is called a device discovery request.

Figure 2:
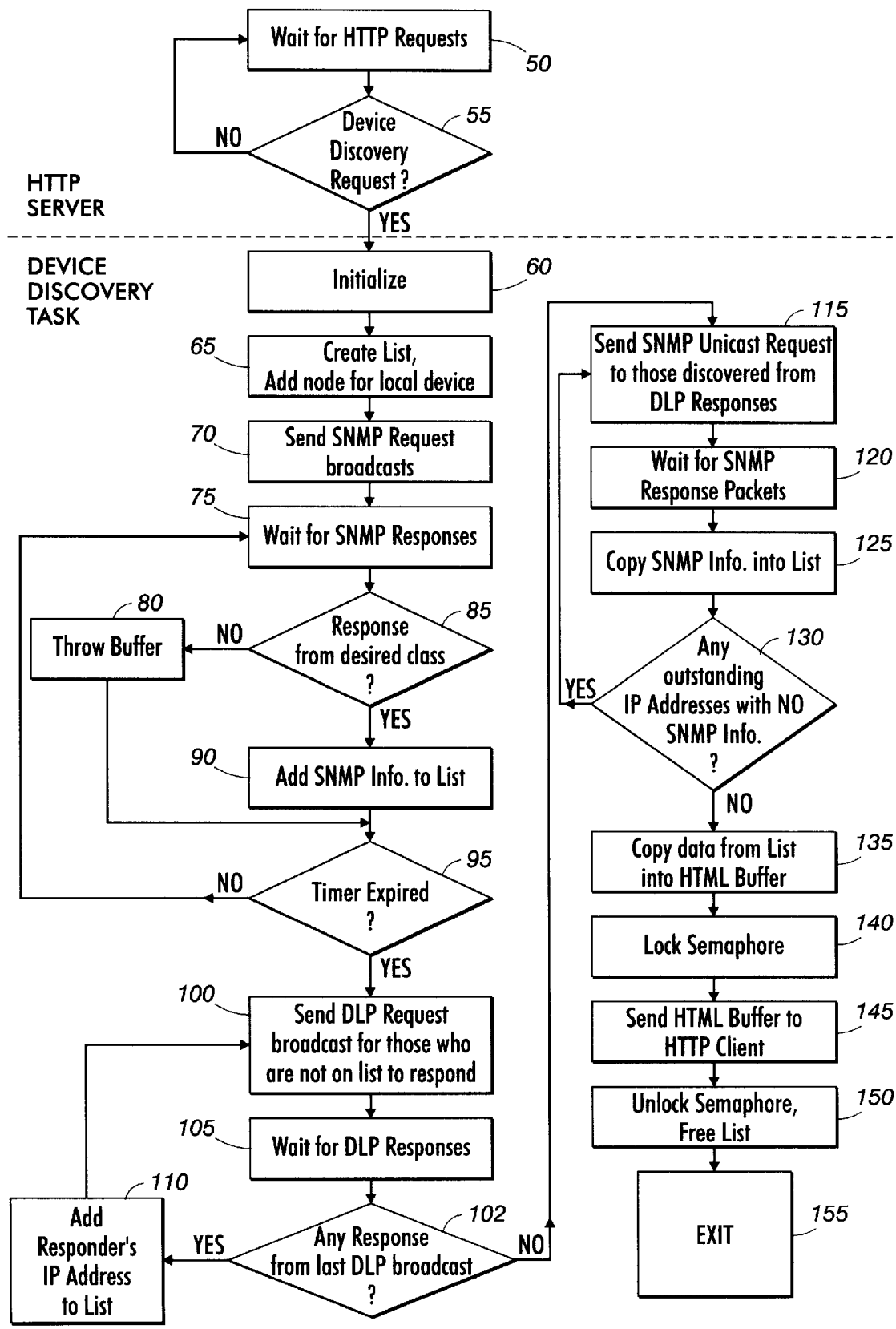
FIG. 2 is a flow chart of the process of network device location according to the present invention.

Referring to FIG. 2, the HTTP server waits for HTTP requests 50. After receiving the device discovery request 55, the HTTP server spawns a device discovery task 10 as shown in FIG. 1. The HTTP server is preferably designed to spawn up to five device discovery tasks, each of which can run concurrently. The priority level of the device discovery task 10 is the same as the priority level of the HTTP server task in the management station 5. This priority level will enable the device discovery task to read as much data as possible from the Internet Protocol (IP) task in the management station 5, and at the same time it will not starve the HTTP server from the processor (CPU) time slice.

Referring to FIG. 2, after the device discovery task initializes 60 (allocates memory, initialize semaphores, etc.), it creates a data structure to store device information 65. In the preferred embodiment, this is a linked list, but may be any other data structure that provides similar features. A node is added to the list 65 for a local device 40, such as that as shown in FIG. 1, and the device name, model and status are copied into the node 65.

The device discovery task 10 is a subset of a typical SNMP Manager, sending SNMP request UDP broadcast packets 70 to all the SNMP Agents 35 who are listening in the same sub-network. These broadcast packets contain a broadcast destination IP address, have a destination port as 161, and are received by any application listening on port 161 on any active node. While the SNMP agents 35 respond to this request broadcast 70, the device discovery task waits 75 for a configured amount of time (TIMEOUT) for all the responses to arrive. The device discovery task 10 uses parsing functions provided by the NEST SNMP library to generate SNMP requests and also to parse the responses from the SNMP Agents 35. The SNMP response packets are parsed with the NEST SNMP library routines in order to extract the object identification and value pair. These values that are extracted from the NEST internal data structure contain information about the device name, model, and status, hereafter called SNMP information.

In the preferred embodiment, the responder's IP address and SNMP information is extracted from these response packets and saved into a linked list 90 only if the packets are from devices in a desired class of devices 85, 80, such as printers of a certain brand, but this step may be skipped without going beyond the scope of this invention. When this step is skipped, any devices residing on the same sub-network that are SNMP Agents 35 could be located. If the response packets are not from devices of the desired class, the packet is simply discarded by the device discovery task 80.

After the expiration of TIMEOUT seconds 95, the device discovery task 10 sends a UDP based broadcast request 100 according to the protocol in FIG. 3, hereafter called (device location protocol) DLP. The DLP broadcast request operates on port 1200 and contains a request for any devices listening 35 that are not already a member of the linked list, to respond. Referring to FIG. 3, the request packet contains the IP addresses of devices that have already responded, such that the devices with a DLP server running will know not to respond if their IP address appears in the list. The length of each IP address is included before each IP address in the request. This is an important improvement over SLP because indicating the length of the IP address before each address, as opposed to merely separating the addresses by a semi-colon (see RFC 2165), DLP servers 35 do not have to parse every byte of the request, which results in faster searches. This is because the DLP server within the network devices 35 will know the length of each address beforehand.

Only DLP servers 35 listening on port 1200 respond to this request. Referring to FIG. 3, the DLP server will reject the request message if any of the following conditions are true:

1) Length of the request buffer is less than 9 bytes. As shown in FIG. 3, the first 8 bytes of the request buffer are for version number (4 bytes) and length of the whole packet (4 bytes). The next 1 byte is allocated for section of the request packet and for indicating the model name. This is a total of at least 9 bytes for the request message.
2) If value in the length section of the request buffer is not equal to the total number of bytes returned in the UDP packet.
3) If the value of the IP address length is more than the calculated value of the bytes following the position of the IP address length field.
4) If any of the values of IP address length field is zero or less than zero.

Whenever the device discovery task 10 receives a DLP response 105, 102, responder's IP address is added to the list 110, only if that IP address is not already found in the list. The DLP response protocol appears in FIG. 4. Note that the response includes the current responder's machine address (MAC address) as well as the IP address. This is also an important improvement over SLP because new devices may not have an IP address, but will be able to be detected anyway.

Referring to FIG. 4, the device discovery task 10 will reject the response if any of the following conditions are true:
1) Length of the response buffer is less than 10 bytes (4 bytes for version number, 4 bytes for the length of buffer, 1 byte for device model name, and 1 byte for device IP Address).
2) If the value of IP Address length field is zero or less.
3) If the length of the buffer is not equal to the total byte return by the recvfrom socket call.
4) If the value of the IP Address length is more than the calculated value of the bytes following the position of the IP Address length field.
5) If the MAC address is less than or equal to zero.
6) If the value of the MAC Address length is more than the calculated value of the bytes following the position of the MAC Address length field.

If at least one response has arrived after the last and most recent DLP request broadcast, another DLP request is generated 102, 100. Otherwise, if no request has arrived after the last and most recent DLP request broadcast the device discovery task 10 closes the DLP port and generates a SNMP request unicast to each of those IP address in the linked list that were added to the list as result of DLP responses 115. These SNMP request messages to each of the IP addresses are unicast messages generated to a maximum set of 10 destinations at a time. After up to a maximum of 10 unicast requests are generated, the device discovery task 10 waits again 120 up to TIMEOUT seconds for the SNMP response packets to arrive. When they arrive, the SNMP information such as device name, model, version number, and device status are copied into the list 125.

This continuous sequence of generating up to 10 SNMP request unicast messages and waiting up to TIMEOUT for the SNMP response packets to arrive and then copying the SNMP information to the list comes to an end when all the remaining IP addresses from the linked list are exhausted 130. The device discovery task 10 then generates the Hypertext Markup Language (HTML) based buffer 135 from the information collected in the linked list. The HTTP server running on the management station 5 is partially single threaded and this single threaded portion is located in the area where the server prepares the HTML buffer to be sent to the HTTP client 15. The device discovery task 10 and other servers may share a semaphore with the HTTP server task, and as a result only one task at a time can prepare and send the HTML buffer back to the HTTP client. Therefore, the device discovery task 10 locks a semaphore 140, and then sends the HTML packet with the generated table of located device information to the HTTP client 15. The device discovery task then unlocks the semaphore 150, frees the list 150 and exits 155.

Figure 5A:
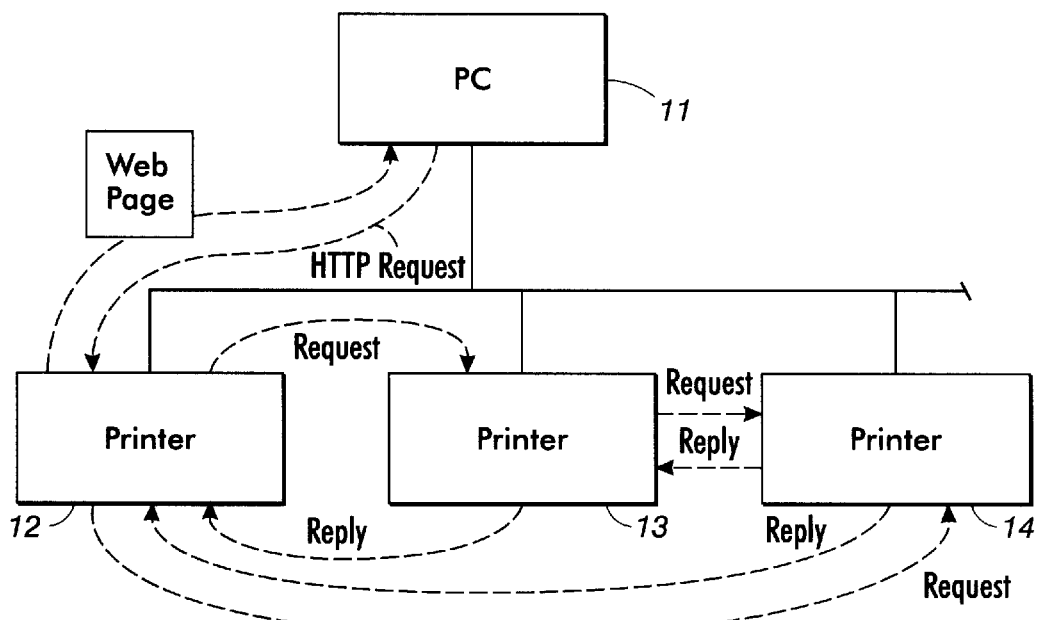
FIG. 5A is a diagrammatic illustration of a device location protocol (DLP) wherein a device (printer) with a known location broadcasts a request and discovers the locations of other unknown devices while permitting the user to select and view the web page of a discovered device.

The approach shown in FIG. 5A has a web client PC 11 send out an HTTP request on a network to a printer 12 with a known location and that device acts as a management station to discover other printers 13 and 14 with unknown network locations. The printer 12 with the known location returns a web page in the form of a formatted HTML page to the user showing its status, with links to the other discovered printers 13 and 14. The user can then select the link to one of the newly discovered printers and view the web page of the selected printer. A newly discovered printer 13 can repeat the process to discover other devices 12 and 14, or newly added devices to the network (not shown). FIG. 6 shows a representative web page for a printer, while FIG. 7 shows a partial listing of printers in a network with the printer name, model number, IP name and status.

Figure 5B:
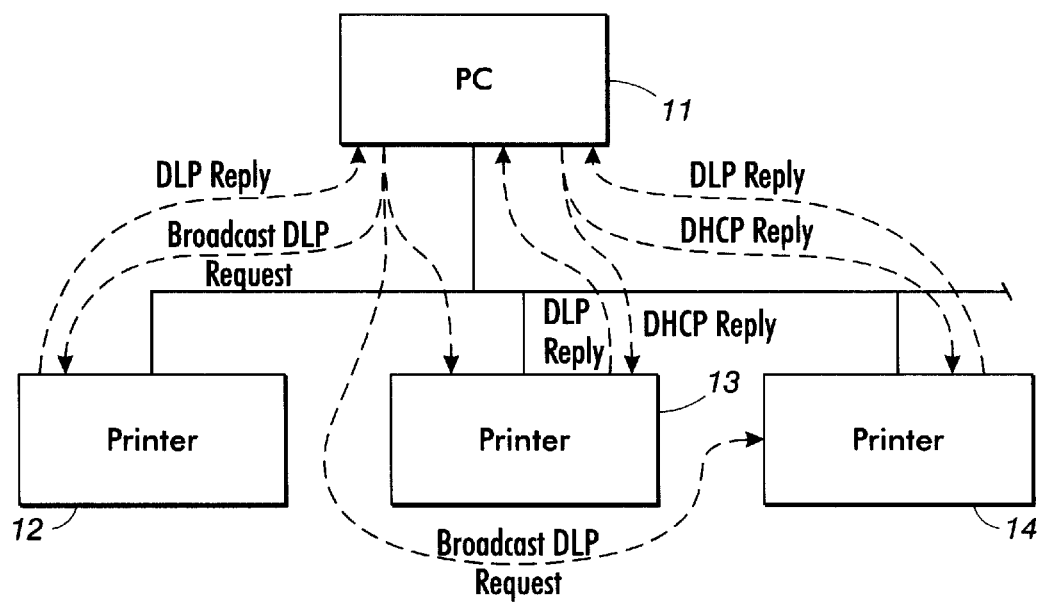
FIG. 5B is a diagrammatic illustration of another device location protocol (DLP) wherein a device (personal computer) broadcasts a request and discovers the locations of unknown devices and assigns an IP address to those discovered devices.

In an alternative approach seen in FIG. 5B, PC 11 sends out a broadcast request to all devices on the network. DLP capable devices 12, 13, and 14 individually send DLP replies to PC 11 which contain information (model and serial number) needed to identify the devices even though the devices do not have an IP address. PC 11 selects an IP address using an algorithm, such as Microsoft's Automatic Private IP Network Addressing employed in Windows 98. The PC 11 uses Dynamic Host Configuration Protocol (DHCP) to assign the IP address to the network device. PC 11 can repeat the process until all devices are identified and assigned an IP address.

Thus, the present invention provides a more exhaustive search and supplements the the UDP based SNMP broadcast and responses in order to receive and read more response packets from network agents.

Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

What is claimed is:

1. A method of locating devices on a network, comprising:
    sending a DLP request out on the network to devices in a selected class, wherein the DLP request includes a list of network addresses of devices in the selected class that have previously responded such that only those devices in the selected class and not on the list will respond, wherein the length of each network address is included before each network address in the list;
    adding to the list of network addresses, addresses of devices in the selected class that respond to the DLP request; and
    repeating the previous two steps until there are no more responses from network devices in the selected class;
    wherein the responses from the devices include at least one of a MAC address and an IP address.

2. The method of claim 1, further comprising, prior to sending the DLP request:
    sending a broadcast request out to each device on a network for network devices of a selected class to respond;
    receiving a reply identifying a replying device of the selected class; and
    adding to the list of network addresses, addresses of devices in the selected class that respond to the first broadcast request.

3. The method of claim 1, further comprising:
    from a first device, sending an HTTP request to a device having a DLP client for sending DLP requests and having a known location on the network for a list of addresses of devices in a selected class on the network; and when there are no more responses from network devices in the selected class, sending the list to the first device.

4. The method of claim 1, further comprising:

returning a web page, wherein the web page includes the list and a link to each device on the list.

5. A system for network device location, comprising:

first device for sending an HTTP request to a device having a known location on the network for a list of addresses of devices on the network; and a second device having a known location on the network, responsive to the HTTP request, for sending a DLP request to devices on the network, responsive to DLP responses from devices on the network, for generating a list of network addresses of responding devices on the network, and for sending the list of network addresses of devices on the network to the first device; wherein the DLP request includes a list of network addresses of devices that have previously responded such that only those devices not on the list will respond; and wherein the length of each network address is included before each network address in the list.

6. The system of claim 5, wherein the second device, prior to sending the DLP request, sends a non-DLP request to devices on the network and, responsive to a non-DLP response from a device in a selected class, updates the list of network addresses.

7. The system of claim 5, wherein the DLP response includes at least one of a MAC address and an IP address of the responding device.

8. The system of claim 5, wherein the first device comprises a computer, and the second device comprises a printer.

9. The system of claim 5, wherein the first device comprises a printer having an HTTP client, the second device comprises a printer having an HTTP server, a DLP client and a DLP server, and each of the responding devices comprises a printer having an HTTP server, a DLP client and a DLP server.

* * * * *